US011415558B2

(12) United States Patent
Charbon et al.

(10) Patent No.: US 11,415,558 B2
(45) Date of Patent: Aug. 16, 2022

(54) DYNAMIC ADJUSTMENT OF PHASED ARRAY PARAMETERS FOR ULTRASONIC INSPECTION

(71) Applicant: Baker Hughes Holdings LLC, Houston, TX (US)

(72) Inventors: Holger Charbon, Siegburg (DE); Johannes Buechler, Siegburg (DE)

(73) Assignee: Baker Hughes Holdings LLC, Houston, TX (US)

( * ) Notice: Subject to any disclaimer, the term of this patent is extended or adjusted under 35 U.S.C. 154(b) by 52 days.

(21) Appl. No.: 17/128,112

(22) Filed: Dec. 20, 2020

(65) Prior Publication Data
US 2022/0196608 A1 Jun. 23, 2022

(51) Int. Cl.
| | | |
|---|---|---|
| *G01N 29/22* | (2006.01) | |
| *G01N 29/024* | (2006.01) | |
| *G01N 29/24* | (2006.01) | |
| *G01N 29/28* | (2006.01) | |
| *G01B 17/02* | (2006.01) | |
| *G01N 29/04* | (2006.01) | |
| *G01N 29/265* | (2006.01) | |

(52) U.S. Cl.
CPC ......... *G01N 29/226* (2013.01); *G01B 17/02* (2013.01); *G01N 29/024* (2013.01); *G01N 29/043* (2013.01); *G01N 29/2437* (2013.01); *G01N 29/265* (2013.01); *G01N 29/28* (2013.01); *G01N 2291/011* (2013.01); *G01N 2291/022* (2013.01); *G01N 2291/023* (2013.01); *G01N 2291/0289* (2013.01); *G01N 2291/044* (2013.01); *G01N 2291/101* (2013.01); *G01N 2291/2636* (2013.01)

(58) Field of Classification Search
CPC .. G01N 29/226; G01N 29/024; G01N 29/043; G01N 29/2437; G01N 29/265; G01N 29/28; G01N 2291/022; G01N 2291/023; G01N 2291/0289; G01N 2291/044; G01N 2291/101; G01N 2291/2636
See application file for complete search history.

(56) References Cited

U.S. PATENT DOCUMENTS

| | | | | |
|---|---|---|---|---|
| 2010/0226210 A1* | 9/2010 | Kordis | ................. | G01S 5/0221 367/127 |
| 2011/0138928 A1* | 6/2011 | Xie | .......................... | G01F 1/44 73/861.63 |

* cited by examiner

*Primary Examiner* — Tarun Sinha
(74) *Attorney, Agent, or Firm* — Mintz, Levin, Cohn, Ferris, Glovsky and Popeo, P.C.; Lisa Adams

(57) ABSTRACT

A method of ultrasonic inspection includes generating, by a phased array ultrasonic probe, a first ultrasonic beam propagating in a fluid and incident at a first angle to a target surface in response to receipt of first instructions. Ultrasonic echoes from first beam reflection by the target are measured and corresponding ultrasonic measurement signals are output. At least one environmental sensor measures at least one fluid property and outputs corresponding environmental signals. One or more processors determine a current speed of sound within the fluid from the ultrasonic measurement signals and environmental signals. Second instructions including a second angle are generated by the processors, based on the current speed of sound, when the current speed of sound differs from a predetermined speed of sound by more than a speed threshold. The ultrasonic probe generates a second ultrasonic beam at the second angle in response to receipt of the second instructions.

15 Claims, 5 Drawing Sheets

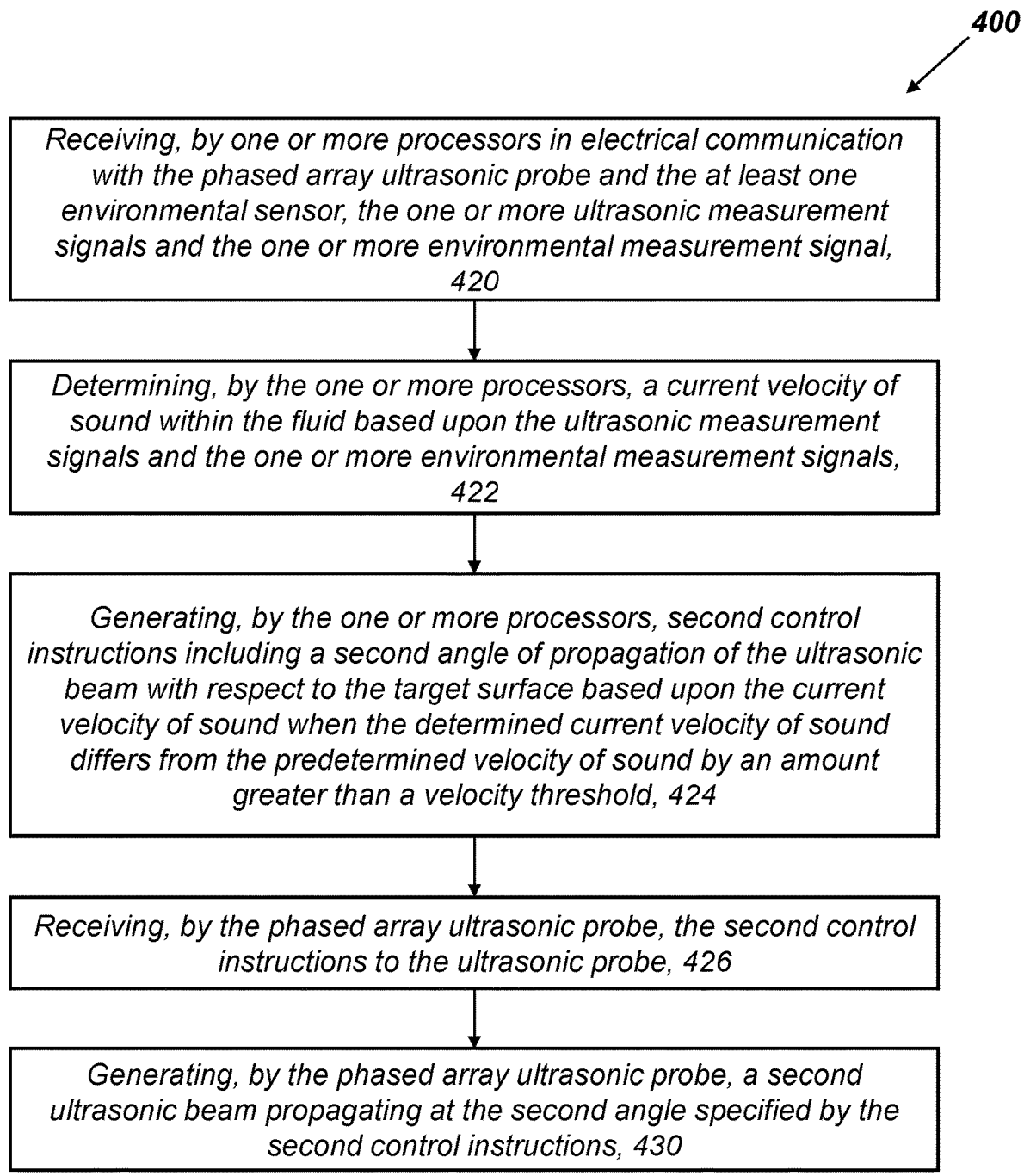
FIG. 4 (con't)

DYNAMIC ADJUSTMENT OF PHASED ARRAY PARAMETERS FOR ULTRASONIC INSPECTION

BACKGROUND

Pipelines are systems of pipes commonly used for long distance transportation of fluids (e.g., liquids and/or gases). As an example, pipelines extend over 1.8 million miles within the United States alone. In order to ensure proper operation, pipelines are inspected and repaired at regular intervals.

Pipeline inspection gages or "PIGs" are devices designed to travel through a section of pipeline and perform one or more functions, such as inspection. As an example, a PIG can be advanced through a pipeline by the pressure of fluid flow through the pipeline, or other differences in pressure within the pipeline. PIGs can carry a variety of sensors when performing inspection of the pipeline. PIGs can also perform other functions, such as separating fluid flows within the pipeline, cleaning the interior surface of the pipeline, amongst others.

SUMMARY

One way to inspect a pipeline is to pass a PIG including a module carrying one or more sensors (e.g., ultrasonic transducers) through the pipeline. The ultrasonic transducers can be configured to transmit ultrasonic signals into the wall of the pipeline and receive reflected ultrasonic signals. Analysis of the reflected ultrasonic signals (e.g., amplitude or intensity as a function of time) can be used to detect features (e.g., defects, geometry, etc.) in the pipe. As an example, ultrasonic signals reflected from the inner and outer surfaces of a pipe can be used to measure the pipe geometry, and ultrasonic signals reflected from within the pipe can be used to identify the presence of defects (e.g., cracks, voids, etc.)

In general, the amplitude of an ultrasonic signal attenuates (decreases) as the signal propagates through a medium due to absorption and scattering (e.g., reflection). In order to facilitate detection of the reflected ultrasonic signal, it can be desirable to configure the transmitted ultrasonic beam to provide a reflected ultrasonic signal that has a relatively large amplitude. If the amplitude of the reflected ultrasonic signal is too low, it can be difficult to detect.

The angle of the transmitted ultrasonic signals and the focal length of the transmitted ultrasonic signal can be selected to maximize (optimize) the amplitude of the reflected ultrasonic signal. However, the angle of the transmitted ultrasonic signals is strongly influenced by the speed of sound of the medium in which the ultrasonic signals propagate, while the focal length is influenced by both the speed of sound and thickness of the target. The speed of sound is a function of the properties of the fluid change (e.g., temperature, pressure, density). Thus, the angle and focal length that optimize the amplitude of the reflected ultrasonic signal can change with changes in the fluid properties.

Existing ultrasonic testing systems can make assumptions regarding the speed of sound and wall thickness in order to mechanically mount the ultrasonic sensors at positions and orientations configured to achieve the angle of incidence and focal length of transmitted ultrasonic signals that maximize the amplitude of the reflected ultrasonic signal. However, if these assumptions are incorrect, error can be introduced into analysis of the reflected ultrasonic signals. Furthermore, even under circumstances where the assumptions are correct, changes in the fluid properties or wall thickness can require time-consuming mechanical re-mounting of the ultrasonic sensors.

In general, systems and methods are provided for improved ultrasonic inspection and, in particular, pipeline inspection employing ultrasonic sensors mounted to a pipeline inspection gage.

In an embodiment, an ultrasonic testing system is provided and can include a phased array ultrasonic probe, at least one environmental sensor, and at least one processor. The phased array ultrasonic probe can be configured to generate, in response to receipt of first control instructions, an ultrasonic beam that propagates within a fluid interposed between the phased array ultrasonic probe and a target at a first angle with respect to the target surface and a first focal length specified by the first control instructions. The phased array ultrasonic probe can also be configured to measure one or more first ultrasonic echoes resulting from reflection of the first ultrasonic beam from the target. The phased array ultrasonic probe can be further configured to output one or more ultrasonic measurement signals representing the measured first ultrasonic echoes. The at least one environmental sensor can be configured to measure a respective environmental property of the fluid and to output one or more environmental measurement signals representing the environmental property measurement. The at least one processor can be in electrical communication with the phased array ultrasonic probe and the at least one environmental sensor. The at least one processor can be configured to receive the one or more ultrasonic measurement signals and the one or more environmental measurement signals. The at least one processor can also be configured to determine a current speed of sound within the fluid based upon the ultrasonic measurement signals and the one or more environmental measurement signal. the at least one processor can be further configured to generate second control instructions including a second angle of propagation of the ultrasonic beam with respect to the target surface when the determined current speed of sound differs from the predetermined speed of sound by an amount greater than a speed threshold. The updated instructions can be based upon the measured environmental property. The at least one processor can be further configured to output the second control instructions including the second angle to the phased array ultrasonic probe.

In an embodiment, the one or more processors can be configured to, when the determined current speed of sound differs from the predetermined speed of sound by an amount greater than the speed threshold, determine a target thickness based at least upon the ultrasonic measurement signals, determine, based upon the determined current speed of sound and the target thickness, a second focal length, generate the second control instructions including the second focal length; and output the second control instructions including the second angle and the second focal length to the phased array ultrasonic probe.

In an embodiment, the phased array ultrasonic probe can be mounted to a sensor carrier of a pipeline inspection gage (PIG) configured for insertion within a pipeline.

In an embodiment, the PIG can also include a plurality of slat-shaped skids extending approximately parallel to a longitudinal axis of the PIG. The phased array ultrasonic probe can be mounted to one or more of the skids.

In an embodiment, the environmental property can be at least one of a temperature of the fluid, a pressure of the fluid, or a density of the fluid.

In another embodiment, a method of ultrasonic inspection is provided. The method can include positioning a phased array ultrasonic probe within an environment including a target and a fluid such that the fluid is interposed between the target and the phased array ultrasonic probe. The method can further include receiving, by the phased array ultrasonic probe, first control instructions including a first angle with respect to a surface of the target and a first focal length. The method can additionally include generating, by the phased array ultrasonic probe, a first ultrasonic beam propagating at the first angle and the first focal length specified by the first control instructions. The method can also include measuring, by the phased array ultrasonic probe, one or more ultrasonic echoes resulting from reflection of the first ultrasonic beam from the target. The method can additionally include outputting, by the phased array ultrasonic probe, one or more ultrasonic measurement signals representing the measured ultrasonic echoes. The method can further include measuring, by at least one environmental sensor, a respective environmental property of the fluid. The method can also include outputting, by the at least one environmental sensor, one or more environmental measurement signals representing the respective measured environmental property. The method can additionally include receiving, by one or more processors in electrical communication with the phased array ultrasonic probe and the at least one environmental sensor, the one or more ultrasonic measurement signals and the one or more environmental measurement signal. The method can also include determining, by the one or more processors, a current speed of sound within the fluid based upon the ultrasonic measurement signals and the one or more environmental measurement signals. The method can further include generating, by the one or more processors, second control instructions including a second angle of propagation of the ultrasonic beam with respect to the target surface based upon the current speed of sound when the determined current speed of sound differs from the predetermined speed of sound by an amount greater than a speed threshold. The method can additionally include receiving, by the phased array ultrasonic probe, the second control instructions to the ultrasonic probe. The method can also include generating, by the phased array ultrasonic probe, a second ultrasonic beam propagating at the second angle specified by the second control instructions.

In an embodiment, the method can further include, when the determined current speed of sound differs from the predetermined speed of sound by an amount greater than the speed threshold, determining, by the one or more processors, a target thickness based at least upon the ultrasonic measurement signals. The method can also include determining, by the one or more processors based upon the determined current speed of sound and the target thickness, a second focal length. The method can additionally include generating, by the one or more processors, the second control instructions including the second focal length. The method can further include generating, by the phased array ultrasonic probe, the second ultrasonic beam propagating at the second angle and the second focal length specified by the second control instructions.

In an embodiment, the phased array ultrasonic probe can be mounted to a sensor carrier of a pipeline inspection gage (PIG) configured for insertion within a pipeline.

In an embodiment, the PIG can further include a plurality of slat-shaped skids extending approximately parallel to a longitudinal axis of the PIG. The phased array ultrasonic probe can be mounted to one or more of the skids.

In an embodiment, the environmental property can be at least one of a temperature of the fluid, a pressure of the fluid, or a density of the fluid.

In another embodiment, a non-transitory computer program product including computer readable instructions is provided. The computer-readable instructions, when executed by at least one data processor, can form part of at least one computing system and implement operations. The operations can include receiving first control instructions by a phased array ultrasonic probe, the first control instructions including a first angle with respect to a surface of a target and a first focal length. The operations can also include generating, by the phased array ultrasonic probe, a first ultrasonic beam propagating at the first angle and the first focal length specified by the first control instructions. The operations can further include measuring, by the phased array ultrasonic probe, one or more ultrasonic echoes resulting from reflection of the first ultrasonic beam from the target. The operations can additionally include outputting, by the phased array ultrasonic probe, one or more ultrasonic measurement signals representing the measured ultrasonic echoes. The operations can also include measuring, by at least one environmental sensor, a respective environmental property of the fluid. The operations can further include outputting, by the at least one environmental sensor, one or more environmental measurement signals representing the measured environmental property. The operations can additionally include receiving, by one or more processors in electrical communication with the phased array ultrasonic probe and the at least one environmental sensor, the one or more ultrasonic measurement signals and the one or more environmental measurement signal. The operations can also include determining, by the one or more processors, a current speed of sound within the fluid based upon the ultrasonic measurement signals and the one or more environmental measurement signals. The operations can further include generating, by the one or more processors, second control instructions including a second angle of propagation of the ultrasonic beam with respect to the target surface based upon the current speed of sound when the determined current speed of sound differs from the predetermined speed of sound by an amount greater than a speed threshold. The operations can additionally include receiving, by the phased array ultrasonic probe, the second control instructions to the ultrasonic probe. The operations can also include generating, by the phased array ultrasonic probe, a second ultrasonic beam propagating at the second angle specified by the second control instructions.

In an embodiment, the operations can further include, when the determined current speed of sound differs from the predetermined speed of sound by an amount greater than the speed threshold, determining, by the one or more processors, a target thickness based at least upon the ultrasonic measurement signals, determining, by the one or more processors based upon the determined current speed of sound and the target thickness, a second focal length, generating, by the one or more processors, the second control instructions including the second focal length, and generating, by the phased array ultrasonic probe, the second ultrasonic beam propagating at the second angle and the second focal length specified by the second control instructions.

In an embodiment, the phased array ultrasonic probe can be mounted to a sensor carrier of a pipeline inspection gage (PIG) configured for insertion within a pipeline.

In an embodiment, the phased array ultrasonic probe can be mounted to one or more slat-shaped skids of a plurality of slat-shaped skids extending approximately parallel to a longitudinal axis of the PIG.

In an embodiment, the environmental property can be at least one of a temperature of the fluid, a pressure of the fluid, or a density of the fluid.

DESCRIPTION OF DRAWINGS

These and other features will be more readily understood from the following detailed description taken in conjunction with the accompanying drawings, in which.

Figure 1:
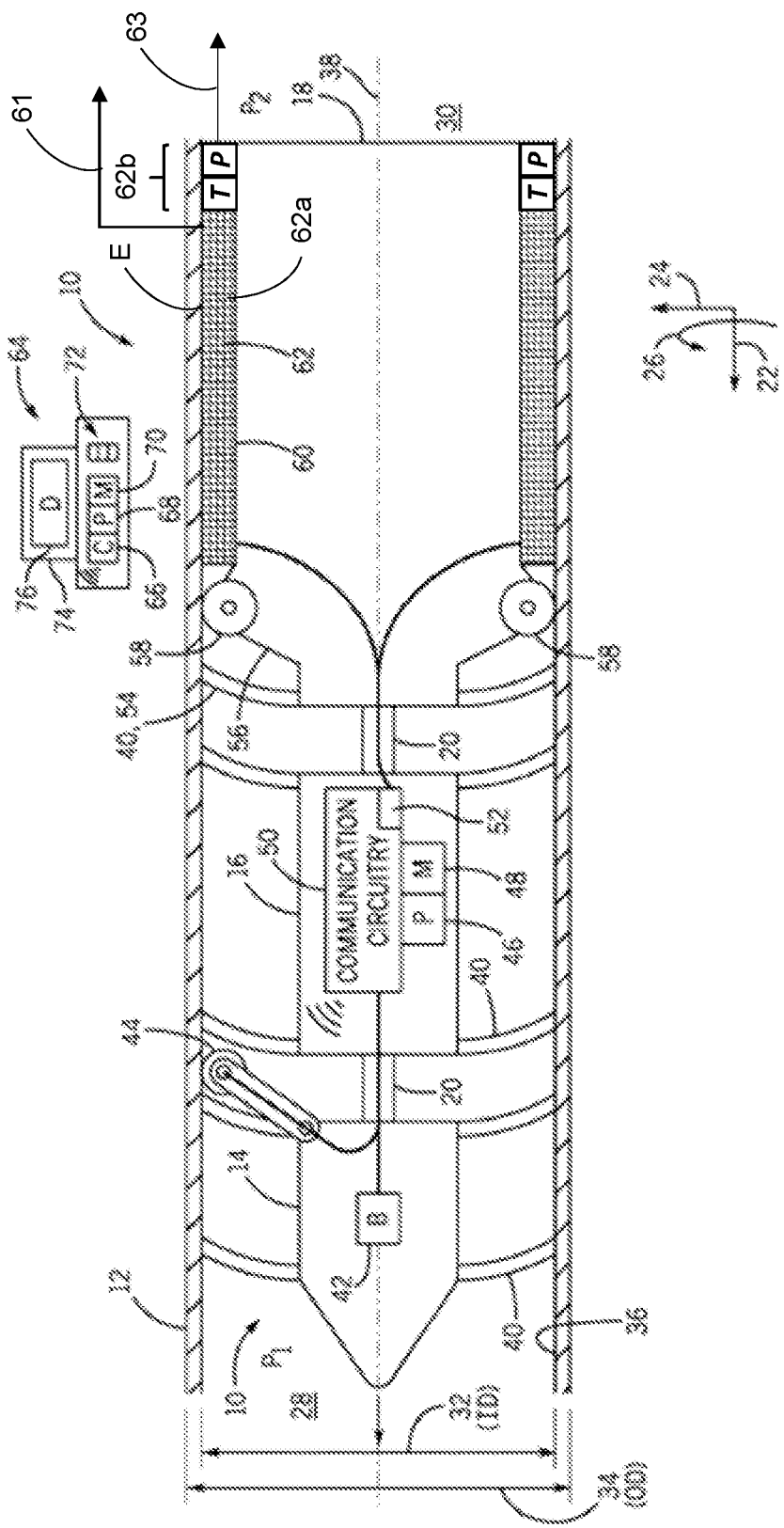
FIG. 1 is a diagram illustrating a cross-section of one exemplary embodiment of an inspection system in the form of a pipeline inspection gage (PIG) positioned within a pipe of a pipeline.

It is noted that the drawings are not necessarily to scale. The drawings are intended to depict only typical aspects of the subject matter disclosed herein, and therefore should not be considered as limiting the scope of the disclosure.

DETAILED DESCRIPTION

A pipeline can be inspected by passing a pipeline inspection gage (PIG) through the pipeline. The PIG can include a sensor carrier module that rides on skids to slide along the interior surface of the pipeline. The sensor carrier module can be equipped with ultrasonic sensors including ultrasonic transducer elements configured to emit and detect ultrasonic signals. In general, it can be desirable to maximize the strength of reflected ultrasonic signals to facilitate detection. This maximization can be accomplished by emitting ultrasonic signals that are incident on the pipeline wall within a range of optimum angles and/or focal lengths. However, one or more properties of a fluid (e.g. a liquid and/or a gas) flowing in the pipeline can cause the speed of sound within the fluid to change, which in turn can cause the angle of emitted ultrasonic signals to change from the optimum angle. Changes in both the speed of sound and the thickness of the target can change the optimum focal length. Existing PIG systems can physically adjust the position and orientation of the ultrasonic sensors prior to each ultrasonic inspection based upon assumptions of the speed of sound and target thickness in order to in order to provide emitted ultrasonic signals within the range of optimum angles and focal length. However, such physical adjustments can be time consuming and costly, requiring labor to remove of the PIG from the pipeline, to perform the adjustment, and to re-deploy the PIG within the pipeline.

Accordingly, embodiments of the present disclosure provide ultrasonic testing systems suitable for use with PIGs that include ultrasonic transducers in the form of phased arrays. The phased array can emit first ultrasonic signals that, when combined, form a first ultrasonic beam which propagates at a first angle and a first focal length with respect to a target in response to first control instructions. The first angle and first focal length can be based on an assumed speed of sound of the fluid in which the ultrasonic signals propagate and an assumed thickness of the target (e.g., a wall thickness when the target is a pipe). Ultrasonic echoes resulting from reflection of the transmitted ultrasonic signals with the target can also be measured by the ultrasonic transducers. The ultrasonic testing system can also include environmental sensors configured to measure one or more environmental properties of the fluid. Based upon the measured environmental properties, the ultrasonic testing system can estimate a current speed of sound and/or target thickness. Under circumstances where the current speed of sound and/or target thickness differs from assumed values (e.g., by greater than respective threshold amounts), the ultrasonic inspection system can determine second control instructions configured to cause the ultrasonic transducers to generate a second ultrasonic beam propagating at a second angle and/or having a second focal length. Beneficially, in this manner, the angle of the emitted ultrasonic beam and/or focal length of the ultrasonic beam, can be changed electronically via the control instructions and real time as the fluid properties change. This avoids the need for mechanical re-adjustment of the ultrasonic sensors when the fluid properties change. Furthermore, the ultrasonic beam can be changed while the PIG is within the pipeline, rather than requiring the PIG to be removed.

For clarity, embodiments of the disclosed ultrasonic testing systems are discussed in the context of an exemplary application, pipeline inspection employing a pipeline inspection gage (PIG). However, it can be understood that the disclosed embodiments are not limited to use for pipeline inspection or in combination with PIGs and can be employed with for other types of inspection and employed alone or in combination with other inspection platforms as necessary.

FIG. 1 is a cross-sectional schematic diagram illustrating one exemplary embodiment of a pipeline inspection gage PIG 10 positioned within a pipeline 12. The PIG 10 can include one or more of a tow (or battery) module 14, a control module 16, and a sensor carrier module 18, connected by linkages 20. As shown, the tow module 14 is the first module in the PIG 10. However, one or more of the modules 14, 16, 18 can be omitted and/or the order of the modules 14, 16, 18 can be different than shown. As an example, embodiments of the PIG 10 can include a scraping, brushing, cleaning, or attracting (e.g., magnetic) module in addition to the sensor carrier module 18.

For clarity, an axial direction 22, a radial direction 24, and a circumferential direction 26 are shown in FIG. 1, though directions may vary. The pipeline 12 can have a downstream end 28 (i.e., in a direction of travel), an upstream end 30 (e.g., opposite the direction of travel), an inside diameter 32, an outside diameter 34, and an interior surface 36 (e.g., cylinder interior surface). A PIG axis 38 is also shown, which can be substantially aligned (e.g., parallel) with the axial direction 22 of the pipeline 12. Accordingly, the PIG axis 38 can be a longitudinal axis of the PIG 10.

One or more of the modules 14, 16, 18 can include sealing/support members 40. The sealing members 40 can be configured to create a seal between respective ones of the modules 14, 16, 18 and the interior surface 36 of the pipeline 12. The sealing members 40 can also provide support for, and center, the respective module 14, 16, 18 in the pipeline 12. The sealing members 40 can further reduce, or substantially eliminate, fluid flow from one side of the sealing member 40 to the other. As an example, the sealing members 40 can be formed from any flexible material capable of forming a seal with the interior surface 36 of the pipeline 12.

In some embodiments, seals created by sealing members 40 can allow for some fluid flow or some pressure equalization. By sufficiently restricting fluid flow, rather than stopping all fluid flow, the sealing members 40 can achieve this function. The sealing members 40 can be arranged in an annular seal structure, which can project radially outward from the modules 14, 16, 18, toward the interior surface 36 of the pipeline 12. In alternative embodiments, the sealing members can adopt other configurations, such as a flat, disc-shaped annular seal structure, a first conical seal structure, a curved annular seal structure, or any combination thereof.

In some embodiments, the tow module 14 can include a battery 42 used to provide power for any components in the PIG 10 such as sensors, processors, memory components, communication circuitry, drive components, pneumatics, hydraulics, etc. The tow module 14 or the control module 16 can also include one or more measuring wheel 44 that is configured to measure the distance traveled by the PIG 10 in the pipeline 12.

The tow module 14 can also include one or more of the sealing members 40 configured to create a seal between the tow module 14 and the interior surface 36 of the pipeline 12. Though FIG. 1 shows one sealing member 40 toward the front of the tow module 14, and one sealing member toward the rear of the tow module 14, the tow module 14 can have any number of sealing members 40.

As shown, the control module 16 follows the tow module 14. The control module 16 can include at least one processor 46 for executing programs, processing data collected from sensors, and the like. The control module 16 may also include a memory 48 component (e.g., a non-transitory computer readable medium) in communication with the processor 46 that may be used to store data, programs, processing routines, instructions for the processor 46, sensor parameters, etc. The control module 16 can also include communication circuitry 50 configured to communicate data from sensors to the processor 46 and memory 48. The communication circuitry 50 can communicate collected data to a user or some device wirelessly or wired data transmission through a port 52. Data analysis and/or communication can be in real time (i.e., as data is collected), near real time (e.g., within microseconds, milliseconds, seconds or tens of second from data being collected), or after the PIG 10 has passed through a section of the pipeline 12.

As with the tow module 14, the control module 16 can include one or more sealing members 40 configured to create a seal between the control module 16, and the interior surface 36 of the pipeline 12, and to minimize fluid flow from one side of the sealing member 40 to the other. As with the tow module 14, the control module 16 may have 1, 2, 3, 4, 5, 6 or more sealing members 40.

As further shown, the sensor carrier module 18 follows the control module 16. The sensor carrier module 18, as with the tow module 14 and the control module 16, can have one or more sealing members 40 to create a seal between the sensor carrier module 18, and the interior surface 36 of the pipeline 12, and to minimize fluid flow from one side of the sealing member 40 to the other. The sealing member 40 can also be used to provide support for the sensor carrier module 18 and/or center the sensor carrier module 18 in the pipeline 12.

A leading sealing member 54 of the sensor carrier module 18 can be followed by a generally annular shaped flexible section 56. The flexible section 56 can be a flexible annular structure or assembly which is configured to expand and contract in the radial direction 24. For simplicity, the flexible section 56 is discussed below in the form of as flexible cone section. However it can adopt other shapes and configurations as necessary. The flexible section 56 can include a plurality of parts arranged in a conical shape or be made of a single monolithic piece.

A plurality of rotational guides 58 can be employed to facilitate movement of the PIG 10 within the pipeline 12. Examples of the rotational guides 58 can include as rollers, balls, and/or wheels in any desired number. The rotational guides 58 can be attached to the flexible section 56, disposed about the flexible section 56 (e.g., cone-shaped section) in the circumferential direction 26 such that the rotational guides 58 are in contact with the interior surface 36 of the pipeline 12, or separated from the interior surface 36 of the pipeline 12 by a thin film of fluid. For simplicity, the following discussion can interchangeably refer to the rotational guides 58 as wheels 58. In some embodiments, the wheels 58 can be of any suitable shape such that they roll along the interior surface 36 of the pipeline 12 as the PIG 10 and sensor carrier module 18 move through the pipeline 12. The illustrated embodiments may include any number of wheels 58. It can be understood, however, that other types of non-rotational guides that reduce friction can be employed in lieu of or in combination with rotational guides.

The wheels 58 can be coupled to, and be followed by, a plurality of slat-shaped skids 60. The skids 60 can extend axially (e.g., approximately parallel) to the PIG axis 38. In the radial direction, the skids 60 can be disposed circumferentially on an outer surface of the sensor carrier module 18. So configured, when the PIG 10 is inserted within the pipeline 12, the skids 60 can be positioned circumferentially about the interior surface 36 of the pipeline 12. The skids 60 can also be in contact with the interior surface 36 of the pipeline 12 or separated from the interior surface 36 of the pipeline 12 by a thin film of fluid (e.g., couplant medium).

An array of sensors 62 can be mounted to one or more of the skids 60, extending down the length of each of the skids 60. In one embodiment, the sensors 62 can be a phased array ultrasonic probe including a plurality of ultrasonic transducer elements 62a. As discussed in greater detail below, the ultrasonic transducer elements 62a can be configured to emit respective ultrasonic signals that, when combined, form an ultrasonic beam which propagates at a predetermined angle with respect to a target in response to instructions. The ultrasonic probe can further output ultrasonic measurement signals 61 representing measurement of ultrasonic echoes resulting from reflection of the ultrasonic beam. The ultrasonic transducers 62a can be any ultrasonic transducer (e.g., piezo ultrasonic transducers, piezocomposite ultrasonic transducers, etc.) configured to detect or size cracks in the pipeline 12, or any other kind of sensor that can be used to inspect a section of pipeline 12.

Further embodiments of the sensors 62 can include at least one environmental sensor 62b in electrical communication with the processor 46. The at least one environmental sensor 62b can be configured to measure an environmental property of an environment E adjacent to the at least one environmental sensor 62b. Examples of such environmental properties can include, but are not limited to, properties of a fluid (e.g., a gas and/or a liquid) within the environment E (e.g., temperature, pressure, density, flow rate, etc.). The environmental sensors 62b can be configured to measure the one or more environmental properties, to convert the measured environmental properties into environmental signals 63 representing the measurement, and to output the environmental signals 63.

Environmental sensors 62b suitable for measuring temperature of the fluid within the environment E can include contact temperature sensors and non-contact temperature sensors. Examples of contact temperature sensors include thermistors (positive or negative coefficient) and thermocouples. Examples of non-contact temperature sensors include infrared (IR) sensors.

Environmental sensors 62b suitable for measuring pressure of the fluid within the environment E can include strain gages, capacitive pressure transducers, potentiometric pressure transducers, resonant wire pressure transducers, piezoelectric sensors, magnetic sensors, and optical sensors.

In FIG. 1, the environmental sensors 62b are illustrated in the form of a pressure sensor P and a temperature sensor T placed adjacent to the ultrasonic transducers 62a. However, in alternative embodiments, the position of the environmental sensors 62b can be varied from that illustrated in FIG. 1.

As further discussed below, in one aspect, the measured ultrasonic echoes and environmental properties measured by the environmental sensors 62b can be employed to determine a current speed of sound within the fluid in which the ultrasonic signals propagate. As an example, the current speed can be estimated based upon the distance between the sensors 62 and the surface of the target and a measured time of flight between transmission of ultrasonic signals by the sensors 62 and measurement of the ultrasonic echoes resulting from reflection of ultrasonic signals from the target surface. The current speed of sound can be employed to update control signals sent to the ultrasonic transducers in order to adjust the angle of the emitted ultrasonic beam.

In another aspect, the measured ultrasonic echoes and environmental properties can be further processed to determine a current target thickness (e.g., a wall thickness of a pipe). As an example, the distance between the sensors 62 and the front surface of the target (e.g., closest to the sensors 62) can be estimated based upon the time of flight of ultrasonic echoes resulting from reflection of emitted ultrasonic signals from the front surface and the current speed of sound. Similarly, the distance between the sensors 62 and the rear surface of the target (e.g., farthest from the sensors 62) can be estimated based upon the time of flight corresponding to ultrasonic echoes resulting from reflection of emitted ultrasonic signals from the rear surface and the current speed of sound. The difference between these two distances can provide the estimate of the target thickness. The current speed of sound and the current wall thickness can be further employed to update control signals sent to the ultrasonic transducers in order to adjust the focal length of the emitted ultrasonic beam. The focal length of the ultrasonic beam can be adjusted alone or in combination with the angle of the ultrasonic beam.

In some embodiments, the sensors 62 can be recessed from the surface of the skids 60 such that the sensors 62 are spaced within a desired distance from the interior surface 36 of the pipeline. In some embodiments, the sensor 62 may be placed at any distance between approximately 0 millimeters and 100 millimeters from the interior surface 36 of the pipeline 12, (e.g., 30 millimeters), although larger distances are possible.

In general, if the downstream 28 ends of the skids 60 remain in contact, or in near contact with the interior surface 36 of the pipeline, the sensors 62 can maintain the desired spacing with the interior surface 36 of the pipeline.

As further shown in FIG. 1, the PIG 10 can be propelled through a section of pipeline 12 by a difference between pressure P1 ahead of the PIG 10 and pressure P2 behind the PIG 10. This pressure difference can be maintained by the sealing members 40. The PIG 10 can pass through the section of pipeline 12 based upon the pressure of a fluid flowing through the pipeline 12 or based upon fluid pressure using a pump in an upstream direction 30 or downstream direction 28 of the PIG 10. In alternative embodiments, however, other techniques for pushing, pulling, propelling, or otherwise passing the pig through the section of pipeline can be used. For example, the PIG can be pulled through the pipeline using a cable, or the PIG can be self-propelled (e.g., with driven wheels, a conveyer belt like track, etc.) through the section of pipeline using a motor or some other method.

Data collected using the PIG 10 can be analyzed by the processor 46 of the control module 16, by an external computing device 64 (e.g., computer, tablet, mobile device, etc.), or a combination thereof. The computing device 64 can include communication circuitry 66, a processor 68, memory 70, communication ports 72, and a user interface 74, which may include a display 76. While the PIG 10 is being passed through the pipeline 12 to take measurements, or following the pipeline pig 10 being passed through the pipeline 12, data can be passed to the computing device 64 wirelessly or through a wired connection via communication ports 52, 72.

The computing device 64 can be located near the PIG 10 or remote from the PIG 10. Under circumstances where the computing device 64 is located remotely relative to the PIG 10, the data can be passed to the computing device 64 via the cloud or over a network. In other embodiments, the computing device 64 can be in wireless communication with the PIG 10 while the PIG 10 is traveling through the pipeline 12 and analyzing data in real time or near real-time.

The computing device 64 can be outfitted with software stored on the memory component 70 and executed by the processor 68 to facilitate analysis of the collected data. The computing device 64 can be capable of post-processing the data collected by the sensors 62. Examples of analysis can include, but are not limited to, one or more of identifying echoes in the data, determining how the ultrasonic signals were reflected within the pipeline wall, and identification of features in the pipeline wall, as well as additional characteristics (e.g., depth) of the identified features.

While FIG. 1 shows one application of the disclosed techniques, using a PIG 10 to inspect a pipeline 12, this is merely an example and not intended to limit the scope of the disclosed techniques. For example, the disclosed techniques may be used to identify the presence of and characteristics of one or more features in a wall 80, or any other piece of material using ultrasonic transducer elements.

Existing phased array ultrasonic sensors are not suitable for use with PIGs for a variety of reasons. In general, existing phased array ultrasonic probes can require separate electronics (e.g., mounted on separate printed circuit boards) and electrical cables for each ultrasonic transducer. In one aspect, the use of many electrical cables is very power inefficient, due to electrical losses within electrical cables. In another aspect, relatively long electrical cables can give rise to undesired signal attenuation. In a further aspect, there are a limited number of interfaces in a PIG for power, ground, output of signals representing measurements, input of control signals, etc. Thus, replacing sensors 62 with existing phased array ultrasonic probes can require completely new wiring to connect to the phased array ultrasonic probes. In other aspects, space is limited on PIGs and the existing phased array ultrasonic probes do not fit within necessary dimensional tolerances.

Embodiments of the phased array ultrasonic probe 100 of the present disclosure address these issues to facilitate 1:1 replacement of conventional ultrasonic probes. As discussed in greater detail below, the phased array ultrasonic probe 100 can be implemented using integrated circuits configured for connection to existing electrical interfaces (e.g., analog and digital interfaces) of the PIG 10 for receiving input of control signals and electrical power, and output of measurement signals. In this manner, power losses and signal attenuation due to cabling can be minimized and rewiring can be avoided. In another aspect, the phased array ultrasonic probe 100 can include all components necessary for generating ultrasonic signals, processing ultrasonic signals, and digital to analog conversion at a dimension similar to conventional ultrasonic probes. Thus, the phased array ultrasonic probe 100 can be suitable for use with legacy electronics external to the PIG without the use of additional electronics.

Figure 2:
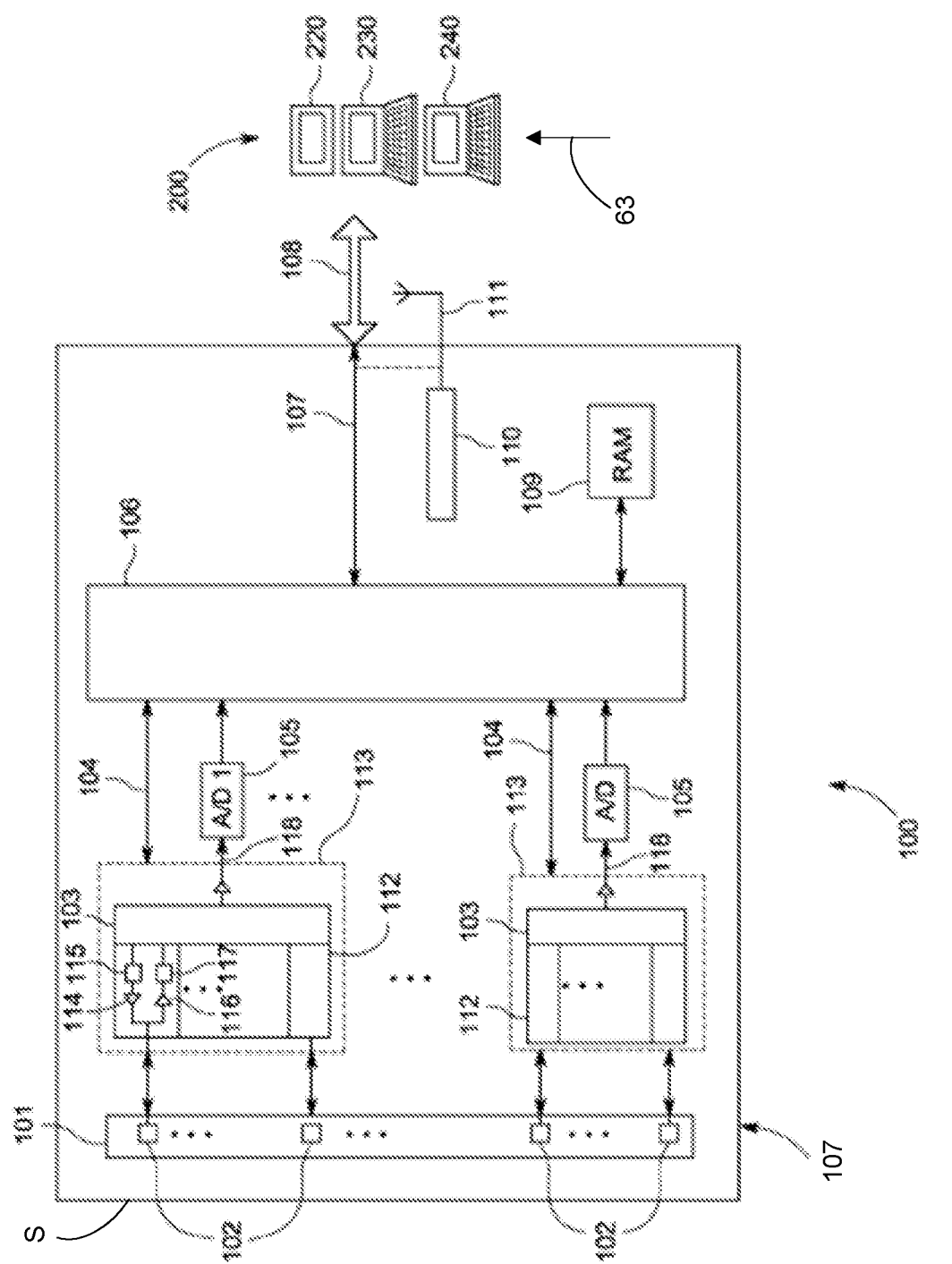
FIG. 2 is a diagram illustrating one exemplary embodiment of a phased array ultrasonic probe for use with the PIG of FIG. 1.

FIG. 2 is a schematic diagram illustrating one exemplary embodiment of the sensors 62 in greater detail. As shown, respective ones of the sensors 62 are in the form of a phased array ultrasonic probe 100 including an array 101 of ultrasonic transducers 102 contained within a housing 107. The ultrasonic transducers 102 are positioned in contact with or adjacent to a sensing surface S of the housing 107, and are each in electrical communication with a transmitter and receiver circuit 112. A transmitter portion of the transmitter and receiver circuits 112 includes a pulser 114 that transmits electrical pulses to a connected one of the ultrasonic transducers 102. The pulser 114 can generate electrical pulses coordinated by a control circuit 103 and buffered in transmitter delay circuits 115, including delays. Thus, the ultrasonic transducers 102 can emit respective ultrasonic signals that, when combined, form an ultrasonic beam that can be steered. The phased array ultrasonic probe 100 can be further capable of emitting ultrasonic beams at multiple, configurable angles with respect to the surface of a target (e.g., an interior surface of the pipeline 12) in response to control signals, avoiding the need for time-consuming and costly mechanical adjustment.

A receiver portion of the transmitter and receiver circuits 112 can include an amplifier 116 and receiver delay 117 for receiving ultrasonic echoes detected by one of the connected ultrasonic transducers 102. In addition to controlling transmitter signals to the ultrasonic transducers 102, the control circuit 103 can be configured to sum the received echo data from all the transmitter and receiver circuits 112 connected to it, using receiver delay circuits 117, as part of a beam forming calculation process. The control circuit 103 can further be configured to transmit the processed echo data to analog-to-digital (A/D) converter 105 over an application specific integrated circuit (ASIC) output port 118. Each ASIC 113 can include an ASIC output port 118 connected to an A/D converter 105 for digitizing the ASIC output which can include A-scan data.

A plurality of transmitter and receiver circuits 112, and a control circuit 103, can be fabricated on a single ASIC 113 having an ASIC output port 118. Thus, the beam formation can be executed on the ASIC 113, which is disposed in the integrated active ultrasonic probe 100. By integrating the transmitter and receiver circuits 112 directly onto the ASIC 113 in the integrated active ultrasonic probe 100, the signal-to-noise ratios can be improved due to the shorter electrical connection as compared to the conventional longer cable connections as described above.

The phased array ultrasonic probe 100 can also include a digital control unit 106. In an embodiment, the digital control unit 106 can be a field programmable gate array (FPGA) with an ASIC data interface 104 for communicating control data to the ASICs 113. The digital control unit 106 can also be connected to the A/D converters 105 for receiving the A/D converted data.

The control unit 106 can further include a digital interface 108 output. The digital interface 108 can include, for example, a standard interface such as a USB interface, PCIe interface, WLAN interface, or Ethernet interface, to communicate with a user computing device 200, such as a tablet computer 220, a laptop computer 230, or a PC/workstation computer 240. In further embodiments, the control unit 106 can employ the digital interface 108 for communication with other control electronics housed in the PIG 10 (e.g., the processor 46). The control unit 106 can be configured to control the different functions of the integrated active ultrasonic probe 100 and the ASICs 113. In one embodiment, four ASICs 113 can be connected to the control unit 106, with each ASIC 113 typically connected to about thirty two ultrasonic transducers 102. This configuration of ultrasonic transducers 102 can be mounted within the integrated active ultrasonic probe 100.

In an embodiment, the digital control unit 106 can implement the standard digital interface 108 using digital transmission over a cable, e.g. USB, PCIe, Ethernet, or over a wireless interface, e.g., WLAN, for data transmission to the user computing device 200. When employing a wireless implementation, a battery 110 can provide power for wireless digital transmission via antenna 111. The data received from A/D converter 105 and processed by control unit 106 can be typically clipped to 16 bit width before it is transmitted to the user computing device 200 over the standard digital interface 108.

Instructions for interrogating a test object can be generated in probe control unit 106, or programmed by the processor 46, and sent to the control circuit 103 in the form of a programmed beam steering operation. The interrogation scheme is stored, for example, in probe memory 109. The scheme might comprise, for example, a series of ultrasonic beams directed at the test object at particular angles (e.g., optimum angles) wherein each beam in the series is slightly shifted by a predetermined number of degrees for a complete scan of the test object. Although the integrated active ultrasonic probe 100 is illustrated and described as a phased array probe, it should be noted that the integrated active ultrasonic probe 100 can include a single ultrasonic transducer 102, or a single ASIC 113 with multiple connected ultrasonic transducers 102.

The computing device 64 can be in the form of the user computing device 200 and it can be in communication with the sensors 62 (e.g., the phased array ultrasonic probe 100 and environmental sensors 62*b*) and it can be configured to execute software for control of operation the phased array ultrasonic probe 100 via a user interface. The software can be scaled in complexity to conform to the phased array ultrasonic probe 100 hardware, for example, the number of transducers 102 mounted in the active ultrasonic probe 100. A peripheral digital interface 203, can connect the phased array ultrasonic probe 100 to processing unit 200 for managing control and data communications between the processing unit 200 and the phased array ultrasonic probe 100 or other components. The digital interface 203 can include, for example, a standard USB interface, Ethernet interface, or PCIe interface, or a wireless, e.g., WLAN or Bluetooth interface. The user computing device 200 can include, but are not limited to, one or more of tablet computers 220, laptop computers 230, and/or PC/workstation computers 240.

Control data sent from the user computing device 200 or the processor 46 to the phased array ultrasonic probe 100 can include configuration set up, mode selection, and initialization data. The user computing device 200 can include one or more processor(s) 202, for running system software and controlling system operations, and memory 204 coupled to the processor 202. Computer program instructions (executable instructions) can be stored in the memory 204 or otherwise available to be executed by the processor 202 such as by downloading from a network.

The user computing device 200 can be in further communication with a display screen 201 allowing the user to view system operations, user interface, and integrated active ultrasonic probe 100 inspection results. The user computing device 200 or the processor 46 can further process A-scan summation data generated by the control unit 106 of the integrated active ultrasonic probe 100. The received A-scan data can be processed via scan conversion and decimation, after which they are displayed on an x-y graph with, for example, depth on the y-axis and distance from the transducer 102 on the x-axis, or with amplitude on the y-axis and time of flight on the x-axis. These displayed data form the signature of a potential anomaly and are typically stored in the memory 204 and post processed to provide additional views for the operator to assist in determining if an anomaly is truly a defect or not. The user computing device 200 can also include a power supply 205, connected to an external AC voltage or provided by a portable power source such as a battery.

Figure 3:
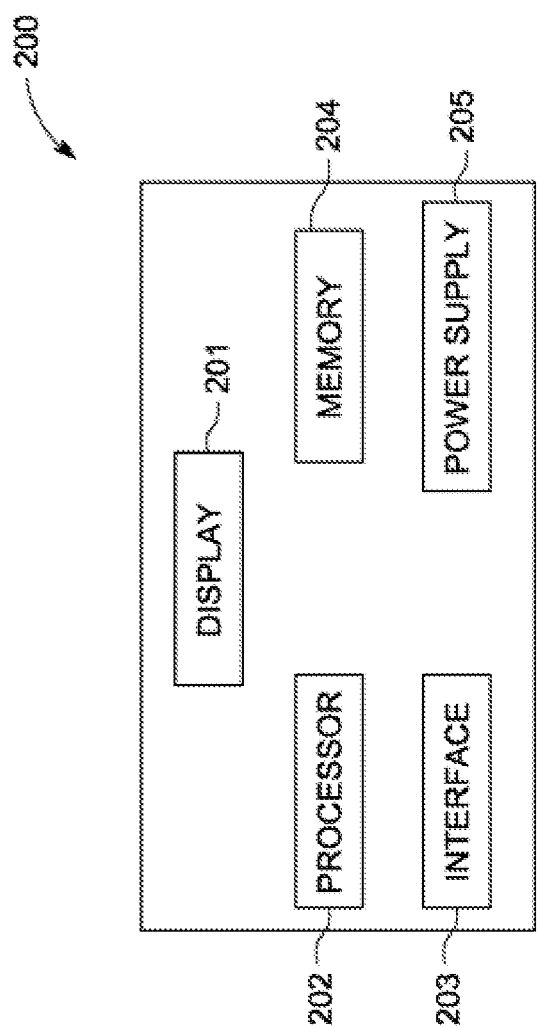
FIG. 3 is diagram illustrating one exemplary embodiment of a user computing device for use with the PIG of FIG. 1.
Figure 4:
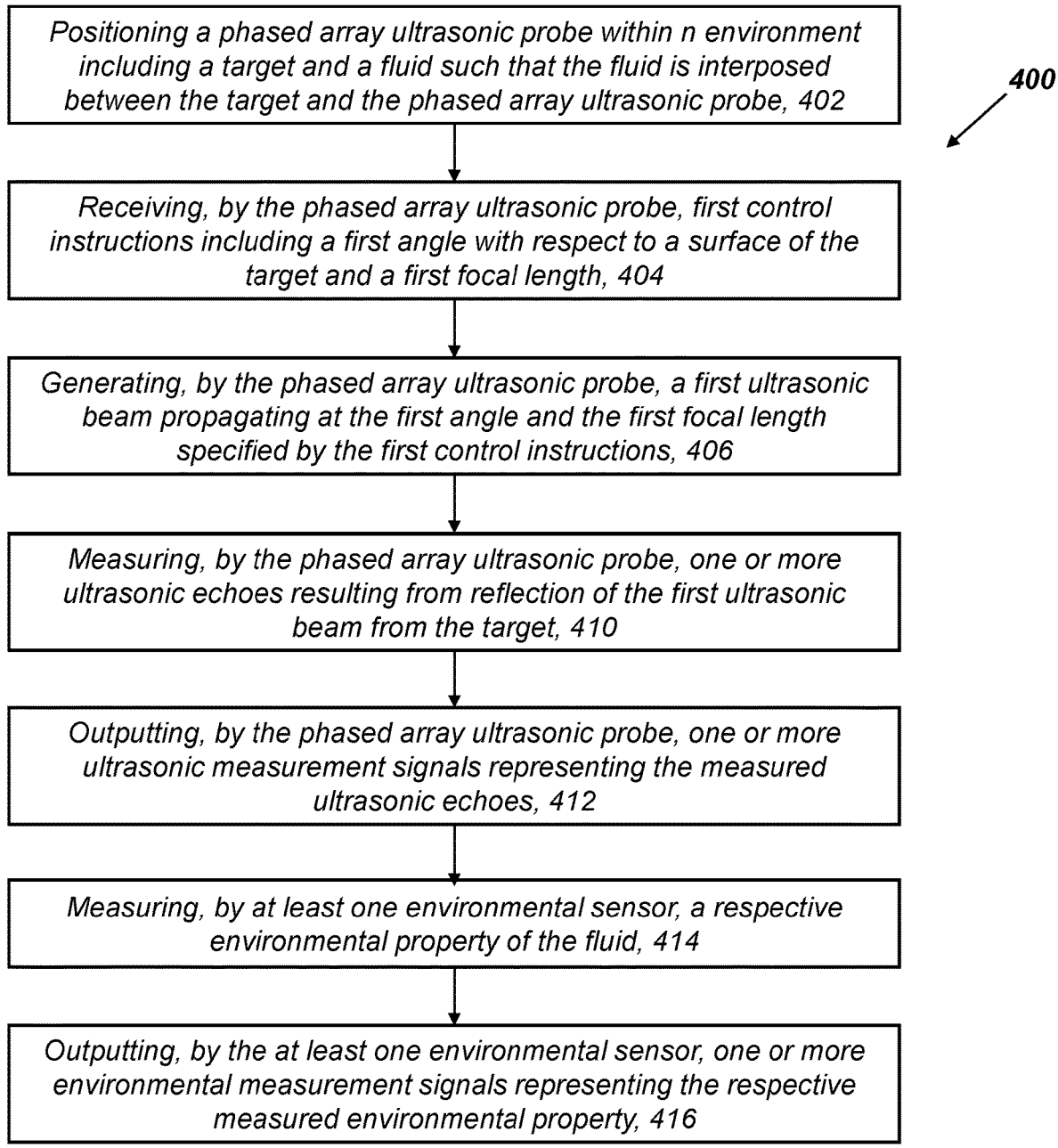
FIG. 4 is a flow diagram illustrating one embodiment of a method of ultrasonic testing employing the system of FIGS. 1-2.

FIG. 4 illustrates a method 400 of ultrasonic inspection configured to be performed by the ultrasonic inspection system of FIGS. 1-3. As shown, the method 400 includes operations 402-430. However, in alternative embodiments, the method can include greater or fewer operations and the operations can be performed in an order different than that illustrated in FIG. 4.

In operation 402, the ultrasonic probe 100 is positioned within the environment E that contains fluid (e.g., oil, gas, air, couplant, etc.) and the target. For example, the sensing face S of the ultrasonic probe 100 can be positioned adjacent to the target (e.g., at a predetermined distance from the surface of the target). As discussed above, the ultrasonic probe 100 can include the housing 107 and an array of the ultrasonic transducer elements 62a elements positioned adjacent to the sensing surface.

In operation 404, first control instructions can be received by the phased array ultrasonic probe 100. As an example, the first control instructions can be received from the user computing device 200 or any other computing device in communication with the ultrasonic probe. The first control instructions can include a first angle of propagation with respect to the surface of the target and a first focal length.

In operation 406, ultrasonic signals 61 (e.g., first ultrasonic signals) can be generated by the phased array ultrasonic probe 100 (e.g., respective ones of the ultrasonic transducers elements 62a) in response to receipt of the first control instructions. The first ultrasonic signals can combine to form a first ultrasonic beam that propagates at the first angle with the first focal length specified by the control instructions. The first angle and the first focal length can be previously determined based upon assumed values of the speed of sound within the fluid.

In operation 410, one or more ultrasonic echoes resulting from reflection of the first ultrasonic beam from the target (e.g., a front surface of the target, a rear surface of the target, reflectors within the bulk of the target, etc.) can be measured by the phased array ultrasonic probe 100 (e.g., respective ultrasonic transducer elements 62a). The measurement can include an amplitude of the ultrasonic echoes and a time of flight between generation of the first ultrasonic beam and detection of the ultrasonic echoes.

In operation 412, one or more ultrasonic measurement signals can be output by the ultrasonic probe 100 (e.g., respective ones of the ultrasonic transducer elements 62a). The ultrasonic measurement signals can represent the measured ultrasonic echoes and can include the measured amplitude and time of flight of the ultrasonic echoes.

In operation 414, an environmental property of the fluid (e.g., between the ultrasonic probe 100 and the target surface) is measured by at least one of the environmental sensors 62b. As discussed above, embodiments of environmental sensors can include temperature sensors, pressure sensors, density sensors, flow rate sensors, or combinations thereof.

In operation 416, one or more environmental measurement signals representing respective measured environmental properties can be output by the one or more environmental sensors. As an example, each environmental sensor can output discrete measurements immediately after acquisition, measurements averaged from a plurality of measurements, measurements averaged over a time window, or any combination thereof.

As noted above, the user computing device 200 (e.g., one or more processors) can be in electrical communication with the ultrasonic probe 100 and the environmental sensor(s) 62b. In operation 420, the measured ultrasonic measurement signals and the environmental measurement signals can be received by one or more processors. The one or more processors can be processor 46, computing device 64, user computing device 200, and combinations thereof.

In operation 422, a current speed of sound within the fluid can be determined based upon the ultrasonic measurement signals and the one or more environmental measurement signals.

The current speed of sound can be compared to the assumed speed of sound by the one or more processors. As an example, a difference between the current speed of sound can be determined. The difference can be further compared to a speed threshold. The threshold can be input by a user via the computing device 64 or the user computing device 200, retrieved from a previously stored configuration file (e.g., stored by the memory 48), or combinations thereof.

In operation 424, when the determined current speed of sound differs from the predetermined speed of sound by an amount greater than the speed threshold the one or more processors can generate second control instructions including a second angle of propagation of the ultrasonic beam with respect to the target surface. The second angle can be based upon the determined current speed of sound.

In operation 426, the second control instructions are transmitted to the ultrasonic probe 100. The second control instructions are operative to command the ultrasonic probe 100 to generate a second ultrasonic beam with the second angle. Subsequently, in operation 420, the second ultrasonic beam is generated by the phased array ultrasonic probe 100 in response to receipt of the second control instructions. It is expected that the second ultrasonic beam angle can result in increased ultrasonic echo strength, as compared to the first ultrasonic beam.

As discussed above, the speed of sound and the target thickness (e.g., wall thickness when the target is a pipe) can influence the optimum focal length that maximizes the amplitude of measured ultrasonic echoes. Accordingly, in further embodiments, when the determined current speed of sound differs from the predetermined speed of sound by an amount greater than the speed threshold, the one or more processors can perform further operations to determine whether the second control instructions should include an updated, second focal length.

In one aspect, the one or more processors can determine a target thickness (e.g., wall thickness) based at least upon the ultrasonic measurement signals. The determination of target thickness can further be performed using the one or more environmental signals.

In another aspect, the one or more processors can determine the second focal length based upon the determined speed of sound and the target thickness.

In a further aspect, the one or more processors can generate the second control instructions including the second focal length.

In an additional aspect, the phased array ultrasonic probe 100 can generate the second ultrasonic beam at the second angle with the second focal length.

While the discussion above refers to the second control instructions including the second angle, alone or in combination with the second focal length, it can be appreciated that alternative embodiments of the method can generate the second control instructions with the second focal length alone, without the second angle.

Generation of the second control instructions and corresponding second ultrasonic beams when the current speed of sound differs by the assumed speed of sound by an amount greater than the speed threshold reflects an understanding that the first angle and/or the first focal length is not suitable to achieve ultrasonic echoes with optimum (e.g., maximized) amplitude due to changes in the speed of sound of the fluid arising from changes in the environmental properties of the fluid.

Similarly, second instructions are not generated when the current speed of sound differs by the assumed speed of sound by less than the speed threshold. This reflects an understanding that the first angle and first focal length remain suitable to achieve ultrasonic echoes with optimum (e.g., maximized) amplitude. That is, the environmental properties of the fluid have not changed to a degree that results in significant deviation of the current speed of sound from the assumed speed of sound.

Exemplary technical effects of the disclosed systems and method can include, but are not limited to, electronic control of the ultrasonic beams generated for non-destructive testing. The disclosed embodiments can be employed for applications including, but not limited to, pipeline inspection using a pipeline inspection gage (PIG). When changes in environmental properties cause the speed of sound within the fluid in which the ultrasonic beams propagate, a previously determined angle and/or focal length of the ultrasonic beam can be unsuitable to maximize the amplitude of ultrasonic echoes. Accordingly, under circumstances where the instant speed of sound of the fluid is determined to differ from an assumed value, updated control instructions can be generated and provided to an ultrasonic probe in order to change the emitted ultrasonic beam (e.g., angle and/or focal length). Beneficially, in this manner, the properties of the emitted ultrasonic beam can be changed without requiring mechanical re-adjustment of the ultrasonic sensors. Furthermore, the direction of the emitted ultrasonic signals can be changed dynamically, while the ultrasonic testing system is in the field (e.g., while a PIG is within a pipeline), rather than requiring removal from deployment.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. An ultrasonic testing system, comprising:
a phased array ultrasonic probe configured to:
generate, in response to receipt of first control instructions, an ultrasonic beam that propagates within a fluid interposed between the phased array ultrasonic probe and a target at a first angle with respect to the target surface and a first focal length specified by the first control instructions;
measure one or more first ultrasonic echoes resulting from reflection of the first ultrasonic beam from the target; and
output one or more ultrasonic measurement signals representing the measured first ultrasonic echoes;
at least one environmental sensor configured to:
measure a respective environmental property of the fluid; and
output one or more environmental measurement signals representing the environmental property measurement;
at least one processor in electrical communication with the phased array ultrasonic probe and the at least one environmental sensor and configured to:
receive the one or more ultrasonic measurement signals and the one or more environmental measurement signals;
determine, a current speed of sound within the fluid based upon the ultrasonic measurement signals and the one or more environmental measurement signal;
generate second control instructions including a second angle of propagation of the ultrasonic beam with respect to the target surface when the determined current speed of sound differs from the predetermined speed of sound by an amount greater than a speed threshold, wherein the updated instructions are based upon the measured environmental property;
output the second control instructions including the second angle to the phased array ultrasonic probe.

2. The ultrasonic testing system of claim 1, wherein:
the one or more processors are configured to, when the determined current speed of sound differs from the predetermined speed of sound by an amount greater than the speed threshold,
determine a target thickness based at least upon the ultrasonic measurement signals;
determine, based upon the determined current speed of sound and the target thickness, a second focal length;
generate the second control instructions including the second focal length; and
output the second control instructions including the second angle and the second focal length to the phased array ultrasonic probe.

3. The ultrasonic testing system of claim 1, wherein the phased array ultrasonic probe is mounted to a sensor carrier of a pipeline inspection gage (PIG) configured for insertion within a pipeline.

4. The ultrasonic testing system of claim 3, wherein the PIG further comprises a plurality of slat-shaped skids extending approximately parallel to a longitudinal axis of the PIG, and wherein the phased array ultrasonic probe is mounted to one or more of the skids.

5. The system of claim 1, wherein the environmental property is at least one of a temperature of the fluid, a pressure of the fluid, or a density of the fluid.

6. A method of ultrasonic inspection, comprising:
positioning a phased array ultrasonic probe within an environment including a target and a fluid such that the fluid is interposed between the target and the phased array ultrasonic probe;
receiving, by the phased array ultrasonic probe, first control instructions including a first angle with respect to a surface of the target and a first focal length;
generating, by the phased array ultrasonic probe, a first ultrasonic beam propagating at the first angle and the first focal length specified by the first control instructions;
measuring, by the phased array ultrasonic probe, one or more ultrasonic echoes resulting from reflection of the first ultrasonic beam from the target;
outputting, by the phased array ultrasonic probe, one or more ultrasonic measurement signals representing the measured ultrasonic echoes;
measuring, by at least one environmental sensor, a respective environmental property of the fluid;
outputting, by the at least one environmental sensor, one or more environmental measurement signals representing the respective measured environmental property;
receiving, by one or more processors in electrical communication with the phased array ultrasonic probe and the at least one environmental sensor, the one or more ultrasonic measurement signals and the one or more environmental measurement signal;
determining, by the one or more processors, a current speed of sound within the fluid based upon the ultrasonic measurement signals and the one or more environmental measurement signals;
generating, by the one or more processors, second control instructions including a second angle of propagation of the ultrasonic beam with respect to the target surface based upon the current speed of sound when the determined current speed of sound differs from the predetermined speed of sound by an amount greater than a speed threshold;
receiving, by the phased array ultrasonic probe, the second control instructions to the ultrasonic probe; and
generating, by the phased array ultrasonic probe, a second ultrasonic beam propagating at the second angle specified by the second control instructions.

7. The method of claim 6, further comprising, when the determined current speed of sound differs from the predetermined speed of sound by an amount greater than the speed threshold:
determining, by the one or more processors, a target thickness based at least upon the ultrasonic measurement signals;
determining, by the one or more processors based upon the determined current speed of sound and the target thickness, a second focal length;
generating, by the one or more processors, the second control instructions including the second focal length; and
generating, by the phased array ultrasonic probe, the second ultrasonic beam propagating at the second angle and the second focal length specified by the second control instructions.

8. The method of claim 7, wherein the phased array ultrasonic probe is mounted to a sensor carrier of a pipeline inspection gage (PIG) configured for insertion within a pipeline.

9. The ultrasonic testing system of claim 8, wherein the PIG further comprises a plurality of slat-shaped skids extending approximately parallel to a longitudinal axis of the PIG, and wherein the phased array ultrasonic probe is mounted to one or more of the skids.

10. The system of claim 7, wherein the environmental property is at least one of a temperature of the fluid, a pressure of the fluid, or a density of the fluid.

11. A non-transitory computer program product comprising computer readable instructions, which, when executed by at least one data processor forming part of at least one computing system, implement operations comprising:
receiving first control instructions by a phased array ultrasonic probe, the first control instructions including a first angle with respect to a surface of a target and a first focal length;
generating, by the phased array ultrasonic probe, a first ultrasonic beam propagating at the first angle and the first focal length specified by the first control instructions;
measuring, by the phased array ultrasonic probe, one or more ultrasonic echoes resulting from reflection of the first ultrasonic beam from the target;
outputting, by the phased array ultrasonic probe, one or more ultrasonic measurement signals representing the measured ultrasonic echoes;
measuring, by at least one environmental sensor, a respective environmental property of the fluid;
outputting, by the at least one environmental sensor, one or more environmental measurement signals representing the measured environmental property;
receiving, by one or more processors in electrical communication with the phased array ultrasonic probe and the at least one environmental sensor, the one or more ultrasonic measurement signals and the one or more environmental measurement signal;
determining, by the one or more processors, a current speed of sound within the fluid based upon the ultrasonic measurement signals and the one or more environmental measurement signals;
generating, by the one or more processors, second control instructions including a second angle of propagation of the ultrasonic beam with respect to the target surface based upon the current speed of sound when the determined current speed of sound differs from the predetermined speed of sound by an amount greater than a speed threshold;
receiving, by the phased array ultrasonic probe, the second control instructions to the ultrasonic probe; and
generating, by the phased array ultrasonic probe, a second ultrasonic beam propagating at the second angle specified by the second control instructions.

12. The non-transitory computer program product of claim 11, wherein the operations further comprise, when the determined current speed of sound differs from the predetermined speed of sound by an amount greater than the speed threshold:

determining, by the one or more processors, a target thickness based at least upon the ultrasonic measurement signals;

determining, by the one or more processors based upon the determined current speed of sound and the target thickness, a second focal length;

generating, by the one or more processors, the second control instructions including the second focal length; and generating, by the phased array ultrasonic probe, the second ultrasonic beam propagating at the second angle and the second focal length specified by the second control instructions.

13. The non-transitory computer program product of claim 11, wherein the phased array ultrasonic probe is mounted to a sensor carrier of a pipeline inspection gage (PIG) configured for insertion within a pipeline.

14. The non-transitory computer program product of claim 12, wherein the phased array ultrasonic probe is mounted to one or more slat-shaped skids of a plurality of slat-shaped skids extending approximately parallel to a longitudinal axis of the PIG.

15. The non-transitory computer program product of claim 11, wherein the environmental property is at least one of a temperature of the fluid, a pressure of the fluid, or a density of the fluid.

* * * * *